(12) United States Patent
Szkudlarek et al.

(10) Patent No.: US 8,470,926 B2
(45) Date of Patent: Jun. 25, 2013

(54) UNSATURATED POLYESTER RESIN

(75) Inventors: Marian Henryk Szkudlarek, Nordhorn (DE); Johan Franz Gradus Antonius Jansen, Geleen (NL); Stefanus Jacobus Duyvestijn, Deventer (NL); Silvana Rensina Antonnietta Di Silvestre, Berg aan de mass (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/255,598

(22) PCT Filed: Mar. 24, 2010

(86) PCT No.: PCT/EP2010/053850
§ 371 (c)(1),
(2), (4) Date: Dec. 20, 2011

(87) PCT Pub. No.: WO2010/108965
PCT Pub. Date: Sep. 30, 2010

(65) Prior Publication Data
US 2012/0095160 A1    Apr. 19, 2012

(30) Foreign Application Priority Data

Mar. 5, 2009 (EP) .................................. 09156139
Mar. 25, 2009 (EP) .................................. 09156130
Mar. 25, 2009 (EP) .................................. 09156131
Mar. 25, 2009 (EP) .................................. 09156137
Mar. 25, 2009 (EP) .................................. 09156142

(51) Int. Cl.
*C08L 67/06* (2006.01)
*C08G 63/52* (2006.01)
*C08G 63/16* (2006.01)

(52) U.S. Cl.
USPC ........... 524/606; 524/601; 528/271; 528/272; 528/274; 528/302; 528/303

(58) Field of Classification Search
USPC .................. 524/604, 601; 528/271, 272, 274, 528/302, 303, 306; 525/27, 35, 36
See application file for complete search history.

(56) References Cited

U.S. PATENT DOCUMENTS

| | | | |
|---|---|---|---|
| 3,326,860 A | 6/1967 | Kramer et al. | |
| 4,112,018 A * | 9/1978 | Traenckner et al. | 525/36 |
| 4,303,696 A * | 12/1981 | Brack | 427/503 |
| 6,025,409 A * | 2/2000 | Jansen | 522/107 |
| 2008/0039593 A1* | 2/2008 | Glockner et al. | 525/450 |

FOREIGN PATENT DOCUMENTS

| | | |
|---|---|---|
| GB | 806 730 | 12/1958 |
| WO | WO 97/27253 | 7/1997 |

OTHER PUBLICATIONS

International Search Report for PCT/EP2010/053850, mailed May 21, 2010.

* cited by examiner

*Primary Examiner* — Michael Pepitone
(74) *Attorney, Agent, or Firm* — Nixon & Vanderhye P.C.

(57) ABSTRACT

The present invention relates to an unsaturated polyester resin comprising itaconate ester units as reactive unsaturation, wherein the resin comprises itaconate, citraconate and mesaconate ester units. Preferably, the resin comprises itaconate, citraconate and mesaconate ester units in an amount of from 40 to 90 mol % itaconate, from 2 to 30 mol % citraconate and from 5 to 40 mol % mesaconate in which 100 mol % is the total amount of itaconate, citraconate and mesaconate esters units.

12 Claims, No Drawings

UNSATURATED POLYESTER RESIN

This application is the U.S. national phase of International Application No. PCT/EP2010/053850, filed 24 Mar. 2010, which designated the U.S. and claims priority to EP Application No. 09156142.3, filed 25 Mar. 2009; EP Application No. 09156131.6, filed 25 Mar. 2009; EP Application No. 09156130.8, filed 25 Mar. 2009; EP Application No. 09156139.9 filed 25 Mar. 2009; and EP Application No. 09156137.3, filed 25 Mar. 2009, the entire contents of each of which are hereby incorporated by reference.

The present invention relates to an unsaturated polyester resin, suitable to be used in the manufacturing of structural parts, comprising itaconate ester units as reactive unsaturations which are especially suitable for high temperature applications in which high thermal stability is important.

With high temperature applications is meant applicable at temperatures above 75° C.

In view of the ecological footprint, there is a high desire to make unsaturated polyesters, which can be used for manufacturing of structural parts, which comprise bio-based building blocks.

The use of petroleum based monomers in the manufacture of consumer products is expected to decline in the coming years because of the continuous rise in the price of oil and the high rate of depletion of known oil reserves. This, in connection with strict government regulations all around the world on environmental protection against pollution, has inspired the investigation of renewable resources as a possible alternative to petroleum based monomers. With the diminishing of the limited petroleum resources, use of renewable resources as chemicals for industrial applications is of great interest. A very suitable example of a biobased building block for unsaturated polyesters is itaconic acid or itaconic anhydride.

Such an unsaturated polyester composition is known from GB 806730. Example 9 of this patent application describes an unsaturated polyesters which comprises itaconic acid. However the cured part obtained from the resin disclosed in this application only had a low thermal stability as indicated by the low HDT of only 70° C.

An example of an application requiring a high HDT is in the automotive industry. Especially parts which are applied under the hood are exposed to high temperatures. Also in the more common tanks applications high temperature resistance is important as in the full sun the temperature of parts of the tank can easily rise to a high level.

The object of the current invention is to provide unsaturated polyester resins containing itaconate ester units which can result in cured parts of which the thermal stability (as indicated by HDT) can be easily tuned.

The inventors have surprisingly found that this objective can be achieved when the unsaturated polyester resin comprises itaconate, citraconate and mesaconate ester units.

Preferably, in order to increase the thermal stability of the cured parts the resin comprises itaconate, citraconate and mesaconate ester units in an amount of from 40 to 90 mol % itaconate, from 2 to 30 mol % citraconate and from 5 to 40 mol % mesaconate in which 100 mol % is the total amount of itaconate, citraconate and mesaconate esters units. As used herein the amount of itaconate, citraconate and mesaconate present in the unsaturated polyester resin is determined using $^1$H-NMR.

More preferably the resin comprises itaconate, citraconate and mesaconate ester units in an amount of from 50 to 80 mol % itaconate, from 5 to 20 mol % citraconate and from 10 to 30 mol % mesaconate in which 100 mol % is the total amount of itaconate, citraconate and mesaconate esters units.

According to one preferred embodiment the resin comprises itaconate, citraconate and mesaconate ester units in an amount of from 55 to 65 mol % itaconate, from 15 to 20 mol % citraconate and from 18 to 28 mol % mesaconate in which 100 mol % is the total amount of itaconate, citraconate and mesaconate esters units.

According to another preferred embodiment the resin comprises itaconate, citraconate and mesaconate ester units in an amount of from 70 to 80 mol % itaconate, from 10 to 20 mol % citraconate and from 10 to 15 mol % mesaconate in which 100 mol % is the total amount of itaconate, citraconate and mesaconate esters units.

An additional advantage of employing unsaturated polyester resins with the above mentioned amounts is that besides an increase in HDT also an increase in flexibility might be observed.

The acid value of the unsaturated polyester resin according to the invention is preferably in the range from 30 to 100 mg KOH/g resin, more preferably from 35 to 75 mg KOH/g resin. As used herein, the acid value of the resin composition is determined titrimetrically according to ISO 2114-2000.

In one embodiment, the molar ratio of hydroxyl end groups and carboxylic acid end groups in the unsaturated polyester resin according to the invention is in the range from 0.33 to 0.9. In another embodiment, the molar ratio of hydroxyl end groups and carboxylic acid end groups in the unsaturated polyester resin according to the invention is in the range from 1.1 to 3.

The hydroxyl value of the unsaturated polyester resin according to the invention is preferably higher than 25 mg KOH/g resin and more preferably higher than 40 mg KOH/g resin. As used herein, the hydroxyl value of the itaconate containing polyester is determined according to ISO 4629-1996.

Preferably, the molecular weight of the unsaturated polyester comprising itaconate ester units as reactive unsaturations is at least 300 Dalton, preferably at least 500 Dalton and more preferably at least 750 Dalton. Preferably, the molecular weight Mn of the unsaturated polyester comprising itaconate ester units as reactive unsaturations is at most 10.000 Dalton, more preferably at most 5000 Dalton. The molecular weight (Mn) is determined in tetrahydrofurane using GPC according to ISO 13885-1 employing polystyrene standards and appropriate columns designed for the determination of the molecular weights.

In a preferred embodiment of the invention, the molecular weight is in the range from 750 to 5000 Dalton.

The glass transition temperature $T_g$ of the unsaturated polyester is preferably at least −70° C. and at most 100° C. In case the unsaturated polyester is applied for construction purposes, the glass transition temperature $T_g$ of the unsaturated polyester resin present in the resin composition according to the invention is preferably at least −70° C., more preferably at least −50° C. and even more preferably at least −30° C. The $T_g$ of the unsaturated polyester resin present in the resin composition according to the invention is preferably at most 70° C., more preferably at most 50° C. and even more preferably at most 30° C. As used herein, the $T_g$ is determined by means of DSC (heating rate 5° C./min).

The unsaturated polyester according to the invention comprises itaconic/citraconic/mesaconic ester units as building blocks (also referred to as itaconic/citraconic/mesaconic acid building blocks). These reactive unsaturations are able to copolymerize with copolymerizable monomer in which the unsaturated polyester may be diluted. The unsaturated polyester according to the invention can be manufactured by polycondensation of at least a polyol and itaconic acid, citraconic acid and/or mesaconic acid or itaconic anhydride and/or citraconic anhydride as unsaturated dicarboxylic acid. The polycondensation may also be effected in the presence of other dicarboxylic acids containing reactive unsaturations, such as for example maleic acid or anhydride and fumaric acid and/or in the presence of saturated aliphatic dicarboxylic acids or anhydrides, like for example oxalic acid, succinic acid, adipic acid, sebacic acid and/or in the presence of aromatic saturated dicarboxylic acids or anhydrides like for example phthalic acid or anhydride and isophthalic acid. In the polymerisation is further used a di- or polyfunctional alcohol. Preferably, a diol is used such as for example 1,2-propylene glycol, ethylene glycol, diethylene glycol, triethylene glycol, 1,3-propylene glycol, dipropylene glycol, tripropylene glycol, neopentyl glycol, isosorbide, 2,3-butanediol, hydrogenated bisphenol-A. or ethoxylated/propoxylated bisphenol A.

According to a preferred embodiment, the molecular weight of the diol in the unsaturated polyester resin is in the range from 60 to 250 Dalton. In a preferred embodiment, the unsaturated polyester according to the invention further comprises isosorbide and/or 1,3-propanediol building blocks, preferably derived from a non fossil source like for example corn.

In the unsaturated polyester resin according to the invention, preferably at least 25 wt. % of the dicarboxylic acid building blocks are itaconic acid building blocks. More preferably, at least 55 wt. % of the dicarboxylic acid building blocks are itaconic acid building blocks in the unsaturated polyester according to the invention.

Preferably at least 15 wt. %, more preferably at least 25 wt. %, even more preferably at least 55 wt. %, of the unsaturated dicarboxylic acid building blocks are itaconic acid building blocks.

In a preferred embodiment, at least part of the itaconic acid or itaconic anhydride is derived from a non-fossil source, for example from corn.

The unsaturated polyester resin according to the invention can be advantageously prepared in the presence of at least one radical inhibitor selected from copper carboxylate, benzoquinone, alkyl substituted benzoquinone, hydroquinone and/or a methyl substituted hydroquinone. In a preferred embodiment, the unsaturated polyester according to the invention is prepared by (i) charging the reactor with itaconic acid, citraconic acid and/or mesaconic acid or itaconic anhydride and/or citraconic anhydride and optionally other diacids, at least one diol, and at least one radical inhibitor selected from copper carboxylate, benzoquinone, alkyl substituted benzoquinone, hydroquinone and/or a methyl substituted hydroquinone, (ii) heating the reactor till a temperature of from 80 to 200° C. until the acid value of the formed unsaturated polyester is below 60,
(iii) cooling the formed resin, preferably to a temperature of from 20 to 120° C., and
(iv) optionally diluting the resin with reactive diluent.

As there exist the possibility that itaconic, citraconic and mesaconic acid, anhydride, half esters and esters thereof may isomerizes into each other, which might be depending on the reaction conditions, kind of diols etc, a non limiting way of obtaining a resin with a certain isomeric ratio is to start with the ratio that one would like to achieve. Depending on the results the man skilled in the art can with some simple experiments come to the desired isomeric ratio in the resin Preferably, the unsaturated polyester resin according to the invention is prepared in the presence of hydroquinone, 2-methylhydroquinone, benzoquinone or 2-methylbenzoquinone as inhibitor, more preferably in the presence of 2-methylhydroquinone as inhibitor and even more preferably, in the presence of hydroquinone and 2-methylhydroquinone as inhibitor.

In one embodiment, the unsaturated polyester resin according to the invention can be applied as a powder coating resin. The preparation of powder coating compositions is described by Misev in "Powder Coatings, Chemistry and Technology" (pp. 224-300; 1991, John Wiley) hereby incorporated by reference. Therefore the present invention also relates to a powder coating composition comprising an unsaturated polyester according to the invention. In case the unsaturated polyester according to the invention is applied in a powder coating composition, the glass transition temperature $T_g$ of the unsaturated polyester resin is preferably at least 20° C., more preferably at least 25° C. and even more preferably at least 30° C. and at most 100° C., more preferably at most 80° C. and even more preferably at most 60° C.

A common way to prepare a powder coating composition is to mix the separately weight-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a powder coating composition of the right particle size. Therefore, the invention also relates to a process for the preparation of a powder coating composition according to the invention comprising the steps of:

a. mixing the components of the powder coating composition according to the invention to obtain a premix
b. heating the obtained premix, preferably in an extruder, to obtain an extrudate
c. cooling down the obtained extrudate to obtain a solidified extrudate and
d. breaking the obtained solidified extrudate into smaller particles to obtain the powder coating composition and preferably comprising the further step of classifying the thus prepared powder particles via a sieve and collect sieve fraction with particle size below 90 μm.

The powder coating composition of the present invention may optionally contain the usual additives, such as for example fillers/pigments, degassing agents, flow agents, or (light) stabilizers. Examples of flow agents include Byk 361 N. Examples of suitable fillers/pigments include metal oxides, silicates, carbonates or sulphates. Examples of suitable stabilizers include UV stabilizers, such as for example phosphonites, thioethers or HALS (hindered amine light stabilizers). Examples of degassing agents include benzoin and cyclohexane dimethanol bisbenzoate. Other additives, such as additives for improving tribo-chargeability may also be added.

In another aspect, the invention relates to a process for coating a substrate comprising the following steps:

1) applying a powder coating composition according to the invention to a substrate such that the substrate is partially or fully coated with a coating.
2) heating the obtained partially or fully coated substrate for such time and to such temperature such that the coating is at least partially cured.

The powder coating composition of the present invention may be applied using the techniques known to the person skilled in the art, for example using electrostatic spray or electrostatic fluidized bed.

In a preferred embodiment of the invention, the unsaturated polyester resin according to the invention is diluted with one or more reactive diluents to obtain a resin composition suitable to be applied for construction purposes. Accordingly, the present invention further relates to a resin composition comprising the unsaturated polyester according to the invention and further comprising reactive diluent.

The amount of such reactive diluent in the resin composition according to the invention is usually in the range from 5 to 75 wt. %, preferably in the range from 20 to 60 wt. %, most preferably in the range from 30 to 50 wt. % (relative to the total amount of unsaturated polyester and reactive diluent present in the resin composition). The diluent will be applied, for instance, for lowering of the viscosity of the resin composition in order to make handling thereof more easy. For clarity purpose, a reactive diluent is a diluent that is able to copolymerize with the unsaturated polyester resin. Ethylenically unsaturated compounds can be advantageously used as reactive diluent. Preferably, the resin composition comprises styrene, dimethyl itaconate and/or a methacrylate containing compound as reactive diluent. In one embodiment of the invention, styrene, α-methylstyrene, 4-methylstyrene, (meth)acrylate containing compounds, N-vinylpyrrolidone and/or N-vinylcaprolactam is used as reactive diluent. In this embodiment, styrene and/or (meth)acrylate containing compound is preferably used as reactive diluent and more preferably (meth)acrylate containing compound is used as reactive diluent. In another embodiment, itaconic acid or an ester of itaconic acid is used as reactive diluent. In a more preferred embodiment, the reactive diluent comprises an ester of itaconic acid and at least another ethylenically unsaturated compound, such as for example styrene, α-methylstyrene, 4-methylstyrene, (meth)acrylates, N-vinylpyrrolidone and/or N-vinylcaprolactam. In this embodiment, the resin composition preferably comprises an ester of itaconic acid as reactive diluent and styrene as reactive diluent or a methacrylate containing compound as reactive diluent. A preferred ester of itaconic acid is dimethyl itaconate.

The resin composition preferably further comprises a co-initiator for the radical curing of the resin composition, in an amount of from 0.00001 to 10 wt % (relative to the total amount of unsaturated polyester and reactive diluent present in the resin composition). A preferred co-initiator is an amine or a transition metal compound.

The amine co-initiator that may be present in the composition is preferably an aromatic amine and even more preferably a tertiary aromatic amine. Suitable accelerators include N,N-dimethylaniline, N,N-diethylaniline; toluidines and xylidines such as N,N-diisopropanol-para-toluidine; N,N-dimethyl-p-toluidine; N,N-bis(2-hydroxyethyl)xylidine and -toluidine. The amount of amine in the resin composition (relative to the total amount of unsaturated polyester and reactive diluent present in the resin composition) is generally at least 0.00001 wt. % and preferably at least 0.01 wt. % and more preferably at least 0.1 wt. %. Generally, the amount of amine in the resin composition is at most 10 wt. %, preferably at most 5 wt. %.

Examples of suitable transition metal compounds as co-initiator are compounds of a transition metal with an atomic number of in the range from 22 to 29 or with an atomic number in the range from 38 to 49 or with an atomic number in the range from 57 to 79, such as vanadium, iron, manganese, copper, nickel, molybdenum, tungsten, cobalt, chromium compounds. Preferred transition metals are V, Cu, Co, Mn and Fe.

After having diluted the unsaturated polyester according to the invention with reactive diluent, additional radical inhibitors may be added. These radical inhibitors are preferably chosen from the group of phenolic compounds, benzoquinones hydroquinones, catechols, stable radicals and/or phenothiazines. The amount of radical inhibitor that can be added may vary within rather wide ranges, and may be chosen as a first indication of the gel time as is desired to be achieved.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), galvinoxyl, aluminium-N-nitrosophenyl hydroxylamine, diethylhydroxylamine, phenothiazine and/or derivatives or combinations of any of these compounds.

Advantageously, the amount of radical inhibitor in the resin composition according to the invention (relative to the total amount of unsaturated polyester and reactive diluent present in the resin composition) is in the range of from 0.0001 to 10% by weight. More preferably, the amount of inhibitor in the resin composition is in the range of from 0.001 to 1% by weight. The skilled man quite easily can assess, in dependence of the type of inhibitor selected, which amount thereof leads to good results according to the invention.

The present invention further relates to a process for radically curing the resin composition according to the invention, wherein the curing is effected by adding an initiator to the resin composition as described above. Preferably, the curing is effected at a temperature in the range of from −20 to +200° C., preferably in the range of from −20 to +100° C., and most preferably in the range of from −10 to +60° C. (so-called cold curing). The initiator is a photoinitiator, a thermal initiator and/or redox initiator.

As meant herein, a photo initiator is capable of initiating curing upon irradiation Photo initiation is understood to be curing using irradiation with light of a suitable wavelength (photo irradiation). This is also referred to as light cure.

A photo-initiating system may consist of a photo initiator as such, or may be a combination of a photo initiator and a sensitizer, or may be a mixture of photo initiators, optionally in combination with one or more sensitizers.

The photo initiating system that can be used in the context of the present invention can be chosen from the large group of photo-initiating systems known to the skilled person. A vast number of suitable photo initiating systems, can be found in, for instance, Volume 3 of "Chemistry and Technology of UV and EB Formulations", $2^{nd}$ Edition, by K. Dietliker and J. V. Crivello (SITA Technology, London; 1998).

The thermal initiator can be selected from azo compounds like for example azo isobutyronitril (AIBN), C—C labile compounds like for example benzopinacole, peroxides, and mixtures thereof. The thermal initiator is preferably an organic peroxide, or a combination of two or more organic peroxides.

The redox initiator is preferably an organic peroxide in combination with at least one of the above mentioned coinitiators. Examples of suitable peroxides are, for instance, hydroperoxides, peroxy carbonates (of the formula —OC(O)OO—), peroxyesters (of the formula —C(O)OO—), diacylperoxides (of the formula —C(O)OOC(O)—), dialkylperoxides (of the formula —OO—), etc.

The present invention further also relates to cured objects or structural parts prepared from unsaturated polyester resin compositions as described above, by curing with an initiator as described above. As used herein, structural resin compositions are capable of providing structural parts which are suitable to be applied for construction purposes. Generally such resin compositions are non-aqueous systems. They contain at most 5% by weight of water, mainly resulting from the reactions during resin preparation. As meant herein, structural parts are considered to have a thickness of at least 0.5 mm and appropriate mechanical properties after curing. End segments where the resin compositions according to the present invention can be applied are for example automotive parts, boats, chemical anchoring, roofing, construction, containers, relining, pipes, tanks, flooring, windmill blades.

The present invention in particular relates to cured objects or structural parts obtained by curing of a resin composition according to the invention with an initiator, preferably comprising a peroxide. According to one embodiment, the curing is preferably effected by moulding, more preferably the curing is effected by compression moulding to obtain in particular a SMC or BMC part. The moulding is preferably effected at a temperature of at least 130° C., more preferably at least 140° C.; and at a temperature of at most 170° C., more preferably of at most 160° C.

The invention is now demonstrated by means of a series of examples and comparative examples. All examples are supportive of the scope of claims. The invention, however, is not restricted to the specific embodiments as shown in the examples.

Standard Resin Synthesis

The diols, diacids and/or anhydrides, optionally inhibitor and catalyst were charged in a vessel equipped with a packed column, a temperature measurement device and inert gas inlet. The mixture was heated slowly by usual methods to 200° C. The mixture was kept at 200° C. until the distillation of water stopped. The packed column was removed and the mixture was kept under reduced pressure until the acid value reached a value below 50 mg KOH/g resin. Then the vacuum was relieved with inert gas, and the mixture was cooled down to 130° C. or lower. The solid unsaturated polyester (UP) resins were obtained in this way. Next the solid resin was dissolved in a reactive diluent at temperatures below 80° C.

Monitoring of Curing

Curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxide as indicated.

Mechanical Property Determination

For the determination of mechanical properties 4 mm castings were prepared. After 16 hrs the castings were released from the mould and postcured using 24 hr at 60 C. followed by 24 hr at 80 C.

Mechanical properties of the cured objects were determined according to ISO 527-2. The Heat Distortion Temperature (HDT) was measured according to ISO 75-A.

The viscosity of the dissolved resin was determined at 23° C. using a Physica instrument.

Barcoll hardness was determined according to DIN EN59.

EXAMPLE 1-3

Following the standard synthesis procedure various resins were prepared using a total of 732 g of itaconic, citraconic and mesaconic acid as starting materials in combination with 471 g 1,3- or 1,2-propanediol. $^1$H-NMR (Varian 300 MHz) analysis revealed the ratio between the various components in the prepared resin. Next the resin was diluted with styrene and the solid content and the viscosity were determined. The resins were cured after dilution using 0.5 wt % of a cobalt solution (NL-49P) followed by 2 wt % Trigonox 44B as peroxide and the mechanical properties are determined.

TABLE 1

|  | Example 1 | Example 2 | Example 3 |
|---|---|---|---|
| diol | 1,3-propane diol | 1,2 propane diol | 1,2 propane diol |
| Itaconic in resin (NMR) (%) | 78 | 56 | 18 |
| Citraconic in resin (NMR) (%) | 10 | 18 | 32 |
| Mesaconic in resin (NMR) (%) | 12 | 25 | 50 |
| Solids (%) | 65 | 65 | 66 |
| Viscosity @ 23° C. (mPa · s) | 668 | 747 | 258 |
| Gel time (min) | 320 | 136 | 60.6 |
| Peak time (min) | 334 | 151 | 85 |
| Peak temperature (° C.) | 143 | 135 | 108 |
| Tensile strength (MPa) | 63 | 79 | 57.4 |
| Tensile modulus (GPa) | 3.0 | 3.4 | 3.0 |
| Elongation @ break (%) | 3.1 | 4.0 | 2.3 |
| Flexural strength (MPa) | 90 | 107 | 113 |
| Flexural modulus (GPa) | 2.8 | 3.2 | 2.8 |
| HDT (° C.) | 105 | 96 | 65 |
| Barcol hardness | 43 | 40 | 43 |

Example 1 and 2 clearly demonstrate that by employing unsaturated polyesters with the ratio of itaconic/citraconic and mesaconic according to a preferred embodiment of the invention the best combination of mechanical properties can be obtained i.e. high thermal stability as indicated by HDT combined with an increased flexibility as measured with the elongation at break. Furthermore these examples demonstrate that various diols can be used without negatively affecting the favourable mechanical properties of the resin especially the HDT of the cured composite. In general these examples demonstrate the suitability of the combination according to the invention for the preparation of unsaturated polyester resins suitable for construction purposes.

EXAMPLE 4 AND 5

Following the standard synthesis procedure various resins were prepared using a total of 732 g of itaconic, citraconic and mesaconic acid as starting materials in combination with 471 g of a mixture of 1,2- and 1,3-propanediols. $^1$H-NMR (300 MHz) analysis revealed the ratio between the various components in the resin. Next the resin was diluted with styrene and the solid content and the viscosity were determined. The resins were cured after dilution using 0.5 wt % of a cobalt solution (NL-49P) followed by 2 wt % Trigonox 44B as peroxide and the mechanical properties are determined.

TABLE 2

|  | Example 4 | Example 5 |
|---|---|---|
| 1,2-propane diol (g) | 47.1 | 235.5 |
| 1,3-propane diol (g) | 423.9 | 235.5 |
| Itaconic in resin (NMR) (%) | 71 | 64 |
| Citraconic in resin (NMR) (%) | 17 | 16 |
| Mesaconic in resin (NMR) (%) | 12 | 20 |
| Solids (%) | 65 | 65 |

TABLE 2-continued

|  | Example 4 | Example 5 |
|---|---|---|
| Viscosity @ 23° C. (mPa · s) | 687 | 655 |
| Gel time (min) | 137 | 164 |
| Peak time (min) | 157 | 177 |
| Peak temperature (° C.) | 131 | 145 |
| Tensile strength (MPa) | 61 | 64 |
| Tensile modulus (GPa) | 3.1 | 3.3 |
| Elongation @ break (%) | 2.5 | 2.5 |
| Flexural strength (MPa) | 117 | 114 |
| Flexural modulus (GPa) | 3.1 | 3.5 |
| HDT (° C.) | 108 | 105 |
| Barcol hardness | 49 | 42 |

These examples clearly illustrate that also mixtures of diols can be employed according to the invention for the preparation of unsaturated polyester resins suitable for construction purposes.

EXAMPLES 6-9

Following the standard synthesis procedure various resins were prepared using a total of 732 g of itaconic, citraconic and mesaconic acid as starting materials in combination with x g of various diols. $^1$H-NMR (300 MHz) analysis revealed the ratio between the various components in the resin. Next the resin was diluted with styrene and the solid content and the viscosity were determined. The resins were cured after dilution using 0.5 wt % of a cobalt solution (NL-49P) followed by 2 wt % Trigonox 44B as peroxide and the mechanical properties are determined. See Table 3.

TABLE 3

|  | Example 6 | Example 7 | Example 8 | Example 9 |
|---|---|---|---|---|
| Used diol |  |  |  |  |
| 1,2-propanediol (g) |  |  |  | 117.7 |
| 1,3-propanediol (g) |  |  | 235.5 | 235.5 |
| Neopentyl glycol (g) | 645 | 645 |  |  |
| Ethylene glycol (g) |  |  | 192 | 96 |

TABLE 3-continued

|  | Example 6 | Example 7 | Example 8 | Example 9 |
|---|---|---|---|---|
| Itaconic in resin (NMR) (%) | 30 | 80 | 75 | 67 |
| Citraconic in resin (NMR) (%) | 12 | 9 | 10 | 17 |
| Mesaconic in resin (NMR) (%) | 43 | 11 | 15 | 16 |
| Solids (%) | 65 | 65 | 65 | 65 |
| Viscosity @ 23° C. (mPa · s) | 382 | 447 | 596 | 525 |
| Gel time (min) | 71 | 42 | 134 | 152 |
| Peak time (min) | 102 | 80 | 147 | 159 |
| Peak temperature (° C.) | 65 | 79 | 163 | 147 |
| Tensile strength (MPa) | 58 | 53 | 63 | 60 |
| Tensile modulus (GPa) | 2.5 | 3.5 | 3.2 | 3.3 |
| Elongation @ break (%) | 3.8 | 1.7 | 2.6 | 2.2 |
| Flexural strength (MPa) | 102 | 114 | 106 | 106 |
| Flexural modulus (GPa) | 2.5 | 3.3 | 3.1 | 3.5 |
| HDT (° C.) | 52 | 100 | 111 | 109 |
| Barcol hardness | 39 | 50 | 49 | 48 |

Comparing Example 6 with Example 7 shows that the mechanical properties of the cured object can be tuned with the isomer ratio in the unsaturated polyester resin. Furthermore, for obtaining a high HDT, a ratio of itaconate from 50 to 80 mol %, citraconate from 5 to 20 mol % and mesaconate from 10 to 30 mol % ester units is preferably used. Furthermore, comparing examples 7, 8 and 9 shows surprisingly that high HDT are more determined by the isomer ratio than by the used diols.

EXAMPLES 10-13

Following the standard synthesis procedure various resins were prepared using a total of 732 g of itaconic, citraconic and mesaconic acid as starting materials in combination with x g of various diols. $^1$H-NMR (300 MHz) analysis revealed the ratio between the various components in the resin. Next the resin was diluted with styrene and the solid content and the viscosity were determined. The resins were cured after dilution using 0.5 wt % of a cobalt solution (NL-49P) followed by 2 wt % Trigonox 44B as peroxide and the mechanical properties are determined. See Table 4.

TABLE 4

|  | Example 10 | Example 11 | Example 12 | Example 13 |
|---|---|---|---|---|
| Used diol |  |  |  |  |
| 1,2-propanediol (g) | 164.8 |  | 235.5 | 253.2 |
| 1,3-propanediol (g) |  |  | 235.5 |  |
| 2,3-butanediol (g) | 362.6 | 557.8 |  |  |
| Isosorbide (g) |  |  |  | 226.14 |
| Itaconic in resin (NMR) (%) | 45 | 52 | 76 | 66 |
| Citraconic in resin (NMR) (%) | 15 | 14 | 9 | 11 |
| Mesaconic in resin (NMR) (%) | 40 | 34 | 15 | 23 |
| Solids (%) | 64 | 65 | 64 | 65 |
| Viscosity @ 23° C. (mPa · s) | 496 | 744 | 735 | 780 |
| Gel time (min) | 124 | 124 | 189 | 130 |
| Peak time (min) | 142 | 142 | 212 | 141 |
| Peak temperature (° C.) | 110 | 110 | 107 | 149 |
| Tensile strength (MPa) | 70 | 50 | 65 | 76 |
| Tensile modulus (GPa) | 3.7 | 3.7 | 3.1 | 3.5 |
| Elongation @ break (%) | 2.2 | 1.4 | 2.7 | 3.4 |
| Flexural strength (MPa) | 94 | 90 | 112 | 120 |
| Flexural modulus (GPa) | 3.6 | 3.8 | 3.4 | 3.5 |
| HDT (° C.) | 91 | 89 | 96 | 98 |
| Barcol hardness | 43 | 43 | 43 | 48 |

These examples further demonstrate that various diols can be used to prepared the unsaturated polyester according to the invention including diols that are more difficult to polycondensate such as 2,3-butanediol and isosorbide.

The invention claimed is:

1. An unsaturated polyester resin comprising itaconate ester units as reactive unsaturation, wherein the resin comprises dicarboxylic acid building blocks comprised of itaconate, citraconate and mesaconate ester units, and wherein the resin comprises itaconate, citraconate and mesaconate ester units in an amount of from 40 to 90 mol % itaconate, from 2 to 30 mol % citraconate and from 5 to 40 mol % mesaconate, in which 100 mol % is a total amount of itaconate, citraconate and mesaconate ester units.

2. The unsaturated polyester resin according to claim 1, wherein the resin comprises itaconate, citraconate and mesaconate ester units in an amount of from 50 to 80 mol % itaconate, from 5 to 20 mol % citraconate and from 10 to 30 mol % mesaconate.

3. The unsaturated polyester resin according to claim 1, wherein the resin comprises itaconate, citraconate and mesaconate ester units in an amount of from 55 to 65 mol % itaconate, from 15 to 20 mol % citraconate and from 18 to 28 mol % mesaconate.

4. The unsaturated polyester resin according to claim 1, wherein the resin comprises itaconate, citraconate and mesaconate ester units in an amount of from 70 to 80 mol % itaconate, from 10 to 20 mol % citraconate and from 10 to 15 mol % mesaconate.

5. The unsaturated polyester resin according to claim 1, wherein at least 25 wt. % of the dicarboxylic acid building blocks are itaconic acid building blocks.

6. The unsaturated polyester resin according to claim 5, wherein at least 55 wt. of the dicarboxylic acid building blocks are itaconic acid building blocks.

7. The unsaturated polyester resin according to claim 1, further comprising isosorbide and/or 1,3-propane diol building blocks.

8. A resin composition comprising the unsaturated polyester resin according to claim 1, and a reactive diluent.

9. The resin composition according to claim 7, wherein the reactive diluent comprises styrene, dimethyl itaconate and/or a methacrylate.

10. A cured object or structural part obtained by curing a resin composition according to claim 8 with an initiator.

11. The cured object or structural part according to claim 10, wherein the initiator comprises a peroxide.

12. A powder coating composition comprising an unsaturated polyester resin according to claim 1.

* * * * *